United States Patent [19]

Bair

[11] Patent Number: 4,464,826
[45] Date of Patent: Aug. 14, 1984

[54] METHOD AND APPARATUS FOR ALIGNING LAMINATIONS IN A STATOR CORE

[75] Inventor: Eugene C. Bair, Holland, Mich.

[73] Assignee: General Electric Company, Fort Wayne, Ind.

[21] Appl. No.: 401,634

[22] Filed: Jul. 26, 1982

[51] Int. Cl.³ .............................................. H02K 15/02
[52] U.S. Cl. ...................................... 29/593; 29/596; 29/705; 29/732; 29/738; 33/174 Q
[58] Field of Search ................. 29/593, 596, 705, 732, 29/736, 738; 33/174 Q, 174 L

[56] References Cited

U.S. PATENT DOCUMENTS 3,490,143  1/1970  Hull ...................................... 29/596
4,222,173  9/1980  Hall .............................. 33/174 Q X Primary Examiner—Carl E. Hall
Attorney, Agent, or Firm—Ralph E. Krisher, Jr.

[57] ABSTRACT

A method and apparatus for very accurately aligning a stack of loose laminations in the manufacture of a stator core for an electric motor or other dynamoelectric machine. The stack of loose laminations is supported on a pallet having a very accurately machined upper surface which is perpendicular to the desired centerline of the rotor accommodating bore. The pallet and lamination stack are moved into the alignment station and the pallet is accurately centered and the reference surface oriented perpendicular to the centerline by means of a tapered pin which acts against a tapered surface on the underneath side of the pallet. An arbor is inserted through the rotor accommodating bore of the stack, and engages a spherical head of the pin lying within the reference plane defined by the reference surface of the pallet, and the opposite end of the arbor is located by means of a second pin so that it is perpendicular to the reference plane. The mounting bolts are then threaded into the pallet, the upper pin releases the top of the arbor so that it is free to rotate about the spherical head of the lower pin, and any misalignment of the bore is measured by sensing the displacement of the upper portion of the arbor.

59 Claims, 18 Drawing Figures

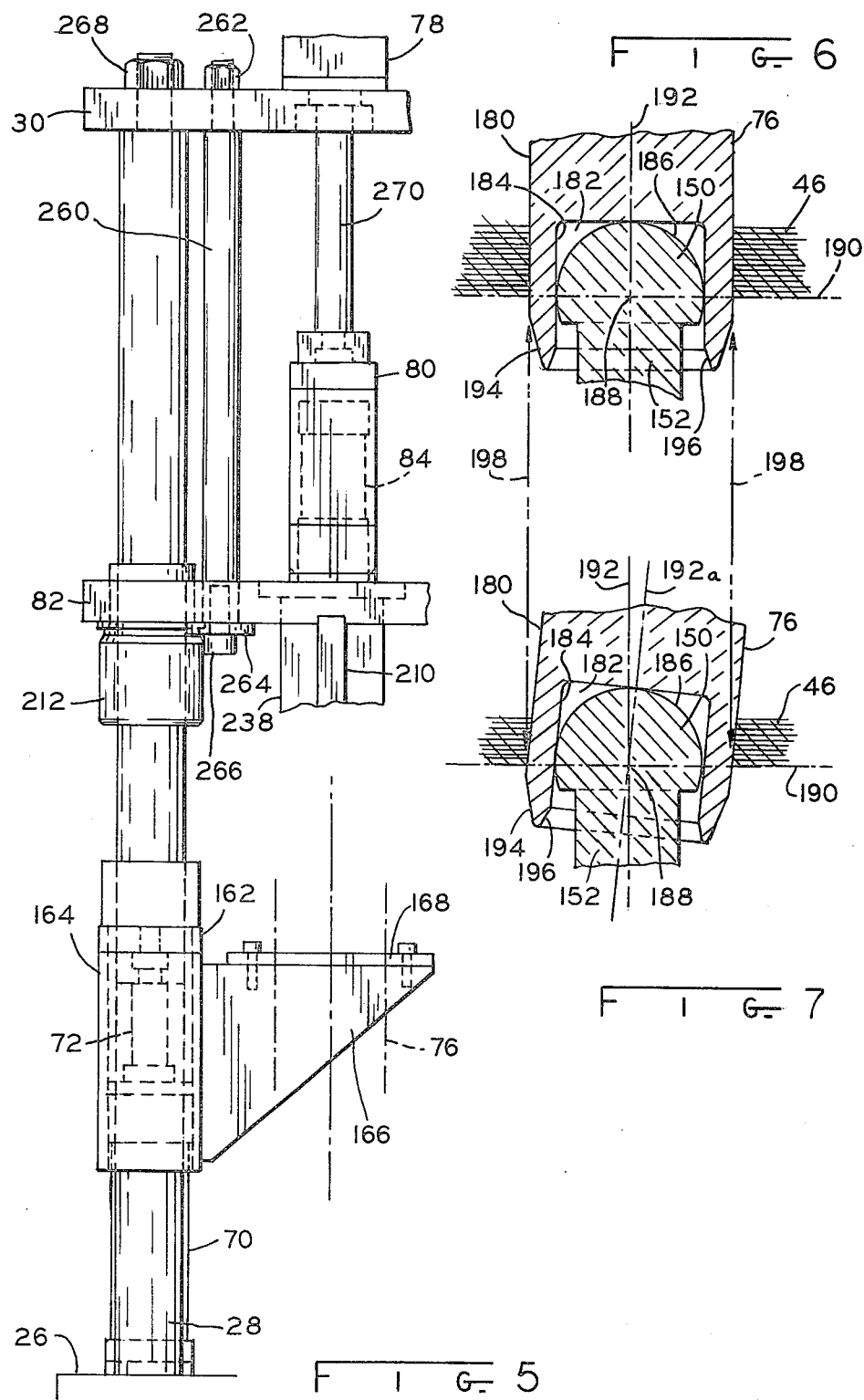

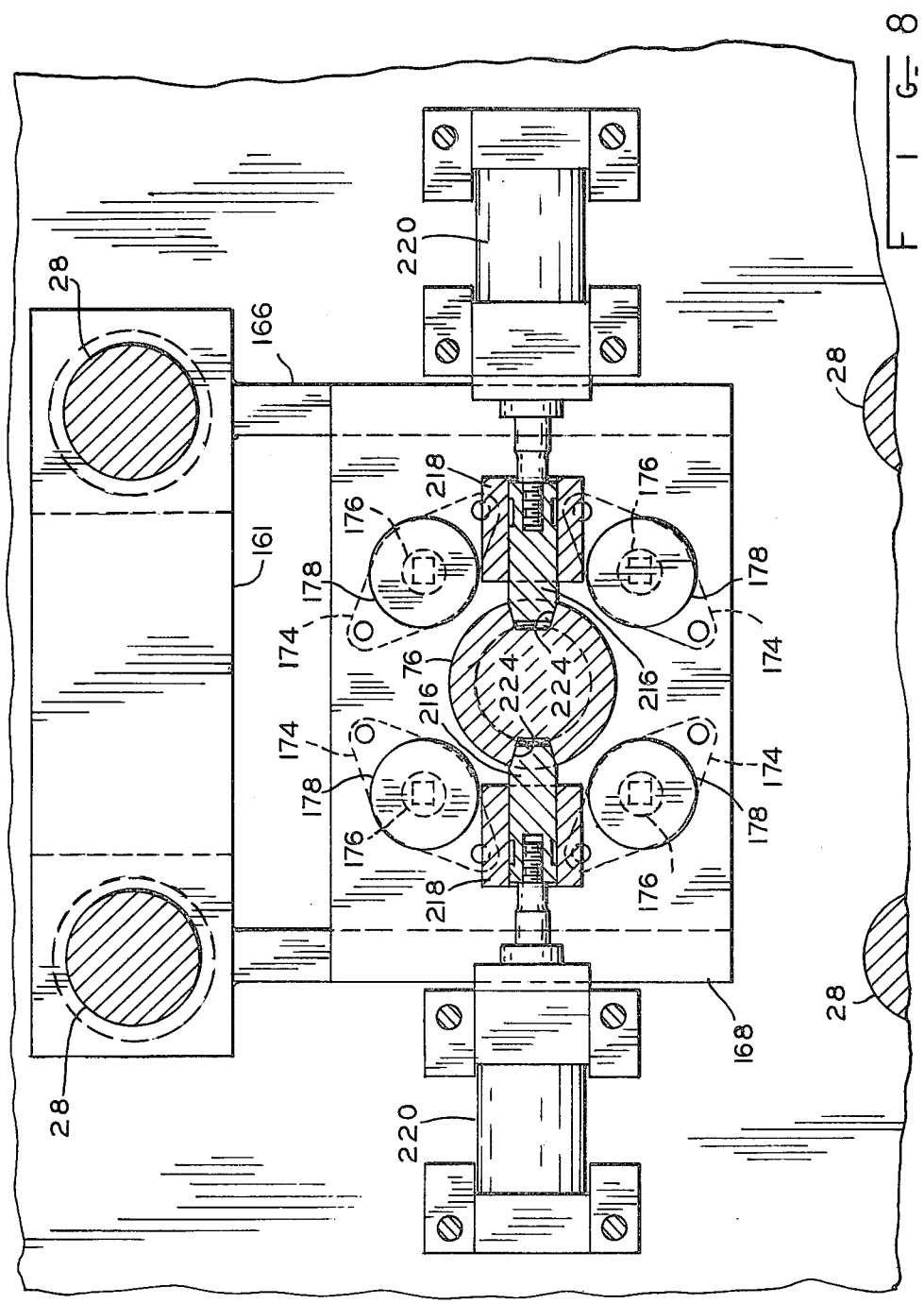

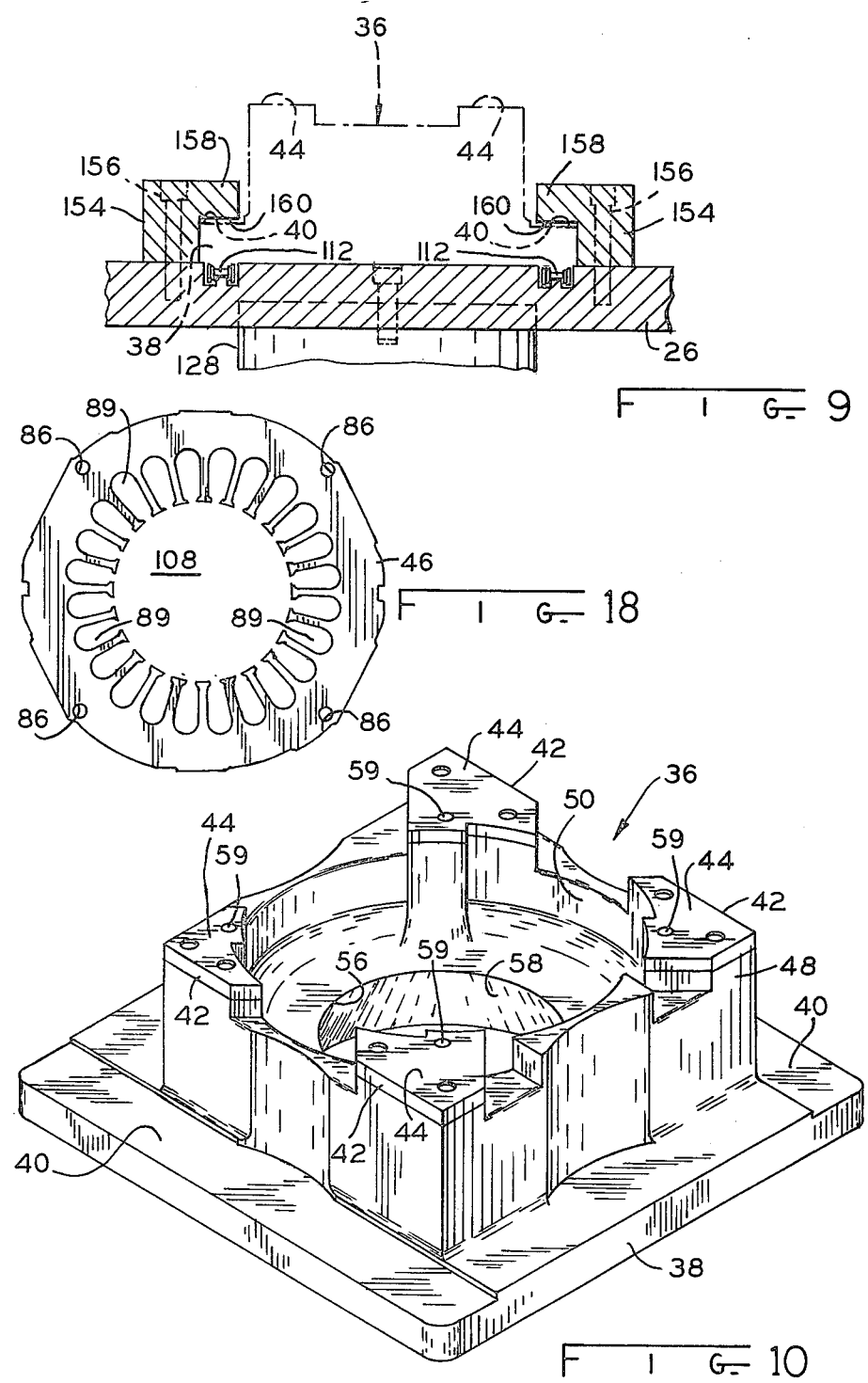

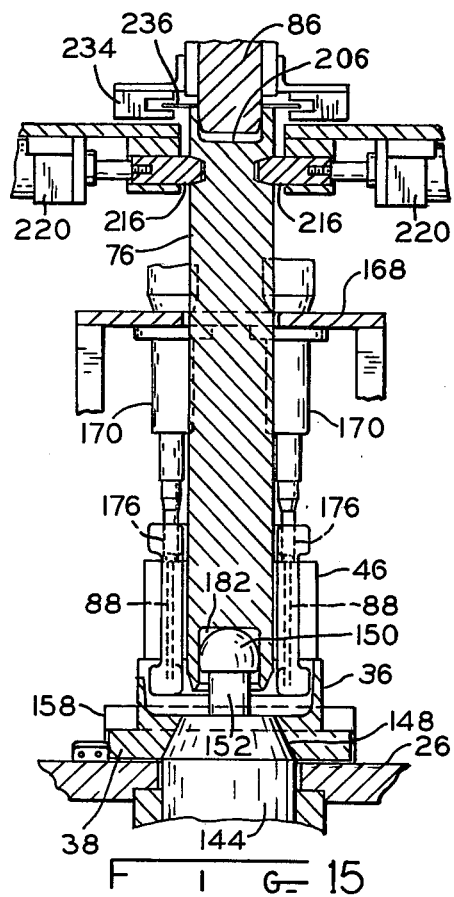
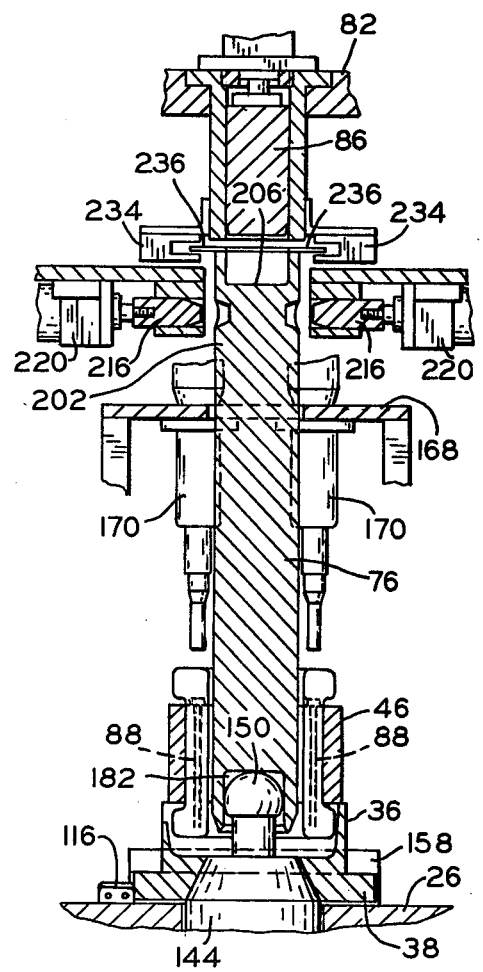
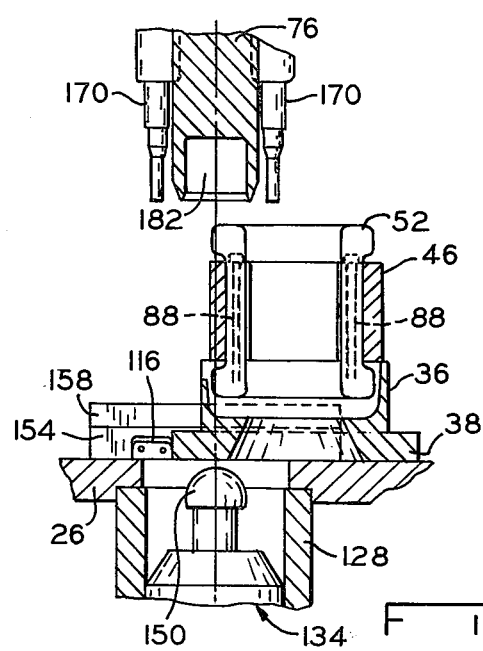

METHOD AND APPARATUS FOR ALIGNING LAMINATIONS IN A STATOR CORE

BACKGROUND OF THE INVENTION

The present invention relates to a method and apparatus for manufacturing a laminated stator core for a motor or other dynamoelectric machine, and in particular to an improved method and apparatus for aligning the laminations of the core so that the rotor accommodating bore is perpendicular to the plane defined by the bottom of the stack.

In the manufacture of dynamoelectric machines, such as electric motors, the stator generally comprises a core comprising a plurality of stacked laminations secured together by welding or bonding. In certain motor applications, such as hermetic refrigeration compressors, it is customary to mount the bottom of the stator to a plurality of mounting pads or surfaces machined on the inner surface of the compressor housing. The stator is connected to the housing generally by means of a plurality of bolts which extend through the stator core and are threadedly secured to the compressor housing. This results in a cantilever mounting arrangement for the stator in that only one end thereof is fastened to the compressor housing and the other end extends upwardly. It is desirable that the plane defined by the machined surfaces of the compressor housing be perpendicular to the axis of the rotor when the motor is installed. In order to accomplish this, it is necessary that the rotor accommodating bore of the stator core be perpendicular to the lower surface of the core itself, since it is this surface which is supported on the machined surfaces of the compressor housing.

It is important for the air gap between the stator and rotor of the motor to be very uniform along the entire axial length of the motor. In many hermetic compressor applications, the rotor is supported by a bearing only at one end thereof, often the same end at which the stator is connected to the compressor housing. Because of the cantilevered supporting arrangement for the rotor, although it is relatively easy to maintain an accurate air gap at the end thereof nearest the bearing, normal flexing and deflection of the rotor at the opposite end will result in a wider variance in air gap, taking into consideration normal machining and bearing tolerances. Accordingly, in order to minimize as much as possible the error in air gap at the end of the stator core furthest from the mounting surfaces of the compressor, it is necessary that the rotor accommodating bore be very accurately aligned perpendicularly to the reference plane, especially at the distal end thereof.

In one prior art technique for manufacturing a stator core, the pre-measured stack of loose laminations is placed on a pallet having an accurately machined upper surface and an opening extending therethrough, wherein the opening is of approximately the same diameter as the rotor accommodating bore of the stacked laminations. The pallet and lamination stack are placed over an alignment post that is secured to a tooling plate, wherein the post is mounted in such a fashion that it is perpendicular to the tooling plate with as much accuracy as is possible. The lower surface of the pallet is machined very accurately to be parallel with the upper surface thereof so that, when the pallet and lamination stack are placed over the post and supported on the tooling plate, the post causes the laminations to align themselves in such a manner that the rotor accommodating bore is perpendicular to the reference plane defined by the upper surface of the pallet.

The pallet is then clamped to the tooling plate, a plurality of bolts are inserted through clearance holes in the stacked laminations and are simultaneously threaded into tapped holes in the pallet by means of power operated nut drivers. When the bolts are tightened thereby compressing the laminations, the compressed laminations may exert a bias on the pallet so that when the clamping force is removed, one corner of the pallet may be lifted away from the tooling surface. When this distortion of the pallet occurs, the rotor accommodating bore of the lamination stack will no longer be perpendicular to the reference plane, and it will be necessary for the machine operator to straighten it by manual techniques. The amount of distortion of the pallet can be measured by air gauges located under the four corners of the pallet. After the compressed stack of laminations has been aligned, the core is dipped into an adhesive, such as a suitable epoxy, the core is spun to distribute the epoxy and eliminate the excess, the bore is burnished, and the mounting bolts are removed. The bonded stator is then transferred to the next stage of the manufacturing process, such as the insertion of the stator windings.

Certain elements of the prior art process and apparatus described above are disclosed in U.S. Pat. No. 3,490,143, issued to Bobbie B. Hull, which patent is expressly incorporated herein by reference.

One problem with the stator core manufacturing technique outlined above results from the fact that the alignment pin is cantilevered to the tooling plate in that it is fastened thereto at only one end. Although the pin is very rigid at the bottom so that perpendicularity with the tooling plate can be obtained with a high degree of accuracy, it is much less rigid at its distal end and is able to be deflected because the distal end is not supported. Furthermore, any non-perpendicularity of the pin is amplified to a greater extent at the distal end thereof thereby resulting in a larger deviation from the true centerline at the distal end.

Although it is very difficult to ever obtain a condition of precise perpendicularity of the alignment pin, the fact that the pin is supported by one end as the laminations are bolted down, results in a greater misalignment at the upper end of the lamination stack with a resulting greater error in air gap tolerance. This result is particularly troublesome in the manufacture of stator cores for compressors wherein the rotor is often supported by a bearing at the lower end of the stator core rather than at the upper end so that the misalignment of the rotor is likely to be greater at the upper end thereby resulting in a larger air gap error at this location. Since the misalignment of the rotor accommodating bore manufactured by the method outlined above is also greater at the upper end than at the lower end of the stator, the air gap error is even more pronounced.

The problem to be solved, then, is to align the stator core laminations in such a manner that very accurate perpendicularity of the rotor accommodating bore is achieved, not only at the bottom of the stack as can be accomplished with the above-discussed prior art technique, but also at the top of the stack where misalignment can least be tolerated.

It is desirable to be able to check the misalignment of the rotor accommodating bore prior to the bonding of the laminations. Once the laminations are bonded, they cannot be broken apart, and in many cases the bore cannot be remachined in the event that it is too far out of tolerance. It is a practice, in some applications, to insert the winding into the loosely stacked laminations before bonding in order to decrease in-process inventory, and also because of the greater ease in inserting the windings into loose laminations. Furthermore, the bonded cores can sometimes be deflected slightly by the winding insertion machinery. In the case where the cores are bonded with the windings in place, an even greater expense results in the event that the bonded assembly has to be scrapped if a misalignment in the stator bore is not detected prior to bonding. In view of the above, it is desirable for the degree of misalignment of the rotor accommodating bore to be measured prior to the step of bonding the laminations together.

SUMMARY OF THE INVENTION

The problems and disadvantages of the prior art technique for aligning the stator laminations as discussed above are overcome by supporting the lamination aligning arbor at both ends thereby insuring that it is perpendicular to the reference plane defined by the support pads of the pallet. Because the arbor is supported at its upper end, such as by an axial pin or other suitable mechanism, the arbor is no longer cantilevermounted and the deflection at the top of the arbor will be no greater than at the bottom so that much less misalignment in the rotor accommodating bore at the top of the stack will occur.

The lower end of the arbor is pivotally supported for tilting movement about a center of rotation located in the reference plane and at the axis of the arbor in such a manner that the outer surface of the arbor in the reference plane always remains precisely concentric with the reference centerline even when the arbor is tilted off center. This arrangement insures that the bottom of the stack is concentric to the reference centerline so that when the top of the arbor is located by the upper locating pin, the arbor will be perpendicular to the reference plane with a high degree of accuracy. In a preferred form of the invention, the arbor is pivotally captured by a lower locating pin that extends upwardly through the pallet and has a mushroom-shaped head thereon that is received in an axial socket in the lower end of the arbor, and wherein the clearance between the lower locating pin head and socket is very close so that the lower end of the arbor is restrained from moving laterally in the reference plane. The radius machined on the locating pin head is such that the peripheral surface of the arbor within the reference plane always remains concentric to the true center line axis of the arbor, at least within a limited range of tilting.

The fact that the lower portion of the arbor is pivotally supported within the reference plane enables the degree of misalignment of the rotor accommodating bore to be measured after the bolts are screwed into the pallet thereby compressing the lamination stack and securing it to the pallet. The upper locating pin for the arbor is retracted so that the arbor is supported only by the lower locating pin and it is free to tilt under the influence of any forces developed in the compressed lamination stack. The degree of tilt is measured by sensing the degree of displacement of the upper end portion of the arbor out of the true centerline by any suitable detection device, such as a plurality of electronic pick-ups located around the periphery of the arbor, and if the degree of displacement exceeds a certain level, the core is flagged for rejection. Because the arbor is several times longer than the height of the stack, it functions as a mechanical amplifier by transmitting any misalignment of the arbor at the top of the stack to the detection devices and multiplying this alignment by a factor related to the ratio between the distance along the arbor between the detectors and bottom of the stack to the distance between the top and bottom of the stack. This enables misalignment of the rotor accommodating bore to be measured with a high degree of accuracy so that the part can be rejected if it does not fall within the required tolerance for rotor bore perpendicularity.

It is an object of the present invention to provide method and apparatus for aligning laminations in a stator core wherein the perpendicularity of the rotor accommodating bore to the bottom of the stack is accomplished with the same degree of accuracy at both the bottom and top of the stack due to the two point support of the alignment arbor.

It is another object of the present invention to enable measuring of the misalignment of the rotor accommodating bore after the laminations have been compressed and bolted to the pallet by measuring the displacement of the top portion of the arbor out of the true centerline when the upper support for the arbor is removed and the arbor is free to tilt under the influence of any biases set up in the compressed lamination stack.

It is another object of the present invention to provide method and apparatus for aligning and compressing a stack of laminations in a stator core and detecting whether the perpendicularity of the rotor accommodating bore falls within prescribed tolerances in a automated operation with only minimal human intervention necessary.

Yet another object of the present invention is to provide a method of aligning and compressing a stack of laminations in the manufacture of a stator core that can be accomplished rapidly and economically.

The invention provides, in one form thereof, a method of aligning laminations in a stator core wherein each lamination has an opening therein comprising the steps of providing a carrier having at least one reference surface defining a reference plane and arranging the laminations in a stacked relation with one end of the lamination stack supported on the carrier reference surface such that the openings are aligned to form a rotor accommodating bore. An arbor is inserted into the bore and a arbor is anchored at a first location on the arbor near the end of the stack that is supported on the carrier reference surface, and the arbor is anchored at a second location on the arbor beyond the end of the stack opposite the end supported on the carrier reference surface such that the arbor is perpendicular to the reference plane and has a very close clearance with the rotor accommodating bore of the stack to thereby orient the bore perpendicularly to the reference plane. The anchoring of the arbor at the second location is independent of the anchoring of the arbor at the first location, and the laminations are compressed together and secured to the carrier reference surface while the arbor is anchored perpendicularly to the reference plane.

Also in general and in one form of the invention, a method is provided for aligning laminations in a stator core wherein each lamination has an opening therein comprising the steps of providing a carrier having a reference surface defining a reference plane and stacking a plurality of laminations on the carrier reference surface to form a stack with one end of the stack being supported on the carrier reference surface such that the lamination openings are aligned to form a rotor accommodating bore. An elongate arbor is inserted into the bore, the arbor having a close clearance with the bore, and one end portion of the arbor is pivotally captured in the reference plane such that the arbor is capable of universal pivoting movement about a center lying in the reference plane but in a manner that the one end portion in the reference plane is restrained from moving laterally relative to the axis of the rotor accommodating bore. The arbor is rigidly anchored at a position on the arbor axially beyond the end of the stack of laminations opposite the end supported on the carrier such that the arbor and the rotor accommodating bore are perpendicular to the reference plane. The laminations are then compressed together and secured to the carrier reference surface while the arbor is anchored perpendicular to the reference plane.

The invention further provides, in one form thereof, a method of aligning laminations in a stator core and detecting any misalignment comprising the steps of providing a carrier having a reference surface defining a reference plane, and stacking a plurality of laminations on the carrier reference surface to form a stack with one end of the stack being supported on the carrier reference surface such that the lamination openings are aligned to form a rotor accommodating bore. An elongate arbor is inserted into the rotor accommodating bore wherein the arbor has a close clearance with a bore, and one end portion of the arbor is pivotally captured in the reference plane such that the arbor is capable of universal pivoting movement about axes lying only in the reference plane and intersecting the arbor axis, but the portion of the arbor in the reference plane is restrained from moving laterally relative to the reference axis of the rotor accommodating bore. The arbor is rigidly anchored at a position on the arbor axially beyond the end of the stacked laminations opposite the end supported on the carrier such that the arbor and the rotor accommodating bore are perpendicular to the reference plane. The laminations are then compressed together and secured to the carrier reference surface while the arbor is anchored perpendicular to the reference plane. The arbor is then disengaged at the position axially beyond the end of the stack opposite the carrier with the other end portion of the arbor still pivotally captured in the reference plane whereby the arbor is free to pivot about the reference plane axes under the influence of the compressed lamination stack, and then sensing the degree to which the free pivoting arbor is non-perpendicular to the reference plane.

Still further, apparatus in one form of the invention is provided for aligning laminations in a stator core wherein the laminations each includes an opening therein and are loosely stacked with the openings generally aligned to form a rotor accommodating bore. The apparatus comprises a carrier having at least one reference surface defining a reference plane and adapted to support the stack of laminations, an arbor having a first end portion and an opposite end portion and a portion adapted to be received in the rotor accommodating bore of the lamination stack having an outer surface just slightly smaller than the inner diameter of the rotor accommodating bore, the arbor adapted to be inserted into the bore. Means are provided pivotally for locating the first end portion of the arbor against any lateral movement in the reference plane but enabling universal pivoting movement of the arbor about a center of rotation located in the reference plane, and means are provided for rigidly anchoring the second end portion of the arbor at a location on the arbor axially displaced beyond the portion thereof adapted to be received in the rotor accommodating bore. The arbor locating means and arbor anchoring means cooperate to align the arbor perpendicular to the reference plane defined by the carrier reference surface.

The invention further provides, in another form thereof, apparatus for aligning laminations in a stator core wherein the laminations each include an opening therein and are loosely stacked with the openings generally aligned to form a rotor accommodating bore. The apparatus comprises a carrier having a reference surface defining a reference plane and adapted to support the stack of laminations, and an elongate arbor having a first end portion and an opposite second end portion and a portion intermediate the end portions having an outer surface just slightly smaller than the inner diameter of the rotor accommodating bore. Means connected to the arbor insert the arbor into the bore of the stack supported on the carrier reference surface such that the intermediate portion of the arbor engages the laminations and aligns the laminations along the axis of the arbor. Means are provided pivotally for locating the first end portion of the arbor against any lateral movement in the reference plane but enabling universal pivoting movement about a center of rotation lying in the reference plane and intersecting the arbor axis. Means engage the second portion of the arbor at a location on the arbor axially displaced beyond the portion thereof received in the stack to anchor the second end portion and align the arbor perpendicular to the reference plane. Means are provided for compressing the laminations in a direction parallel to the axis of the rotor accommodating bore and for securing the compressed laminations to the carrier while the arbor is anchored. Means operative when the second end portion of the arbor is released detect the displacement of the arbor second end portion from its former position when it was anchored by the means for engaging and indicate the degree of misalignment of the arbor under the influence of the compressed laminations.

The invention further provides, in one form thereof, apparatus for aligning laminations in a stator core and detecting any misalignment thereof wherein each lamination has an opening and the laminations are loosely stacked with the openings generally aligned to form a rotor accommodating bore. The apparatus comprises a support having a reference surface coplanar with a reference plane, the support being adapted to support one end of the lamination stack thereon, and an elongate arbor adapted to be positioned in and extend through the rotor accommodating bore of the stack. Means are provided for rigidly immobilizing the arbor in a predetermined orientation relative to the reference plane along a reference axis, the arbor having a very close clearance with the bore to thereby orient the bore to the reference plane along the reference axis. A substantial portion of the arbor extends beyond the end of the lamination stack opposite the end thereof supported on the reference surface. The apparatus includes means for compressing the laminations together, means for releasing the arbor while the laminations are in a compressed state to enable the arbor to tilt relative to the reference axis under the influence of the stacked laminations, and means for sensing a lateral displacement of the arbor from the reference axis at a reference position on the arbor substantially beyond the end of the stack opposite the end thereof supported on the reference surface. The distance between the reference position and the reference plane is substantially greater than the distance along the arbor between the ends of the stack by a preselected ratio, whereby the amount of misalignment of the arbor within the stack is amplified at the reference point on the arbor by a factor related to the preselected ratio.

Also in one form thereof, the invention relates to a method of aligning laminations in a stator core and detecting any misalignment thereof wherein each lamination has an opening therein. The method comprises the steps of arranging the laminations in a stacked relation with one end of the lamination stack being supported on a reference surface such that the openings are aligned to form a rotor accommodating bore, the reference surface being coplanar with a reference plane, and positioning an elongate arbor in the rotor accommodating bore and rigidly immobilizing the arbor in a predetermined orientation to the reference plane along a reference axis. The arbor has a very close clearance with the bore to thereby orient the bore to the reference plane along the reference axis, and a substantial portion of the arbor extends beyond the stack opposite end. The laminations are compressed together, and while in a compressed state, the arbor is released to enable it to tilt relative to the reference axis under the influence of the stacked laminations. The displacement of the arbor from the reference axis is sensed at a reference position on the arbor substantially beyond the stack opposite end, the distance between the reference point and the reference plane being substantially greater than the distance between the stack opposite end and the reference plane by a preselected ratio, whereby the amount of misalignment of the arbor at the opposite end of the stack is amplified by a factor related to the preselected ratio.

BRIEF DESCRIPTION OF THE DRAWINGS

FIG. 5 is a side elevational view of the rear portion of the guide post assembly for the apparatus;

FIG. 6 is a schematic sectional view illustrating the alignment arbor aligned with the true centerline;

FIG. 7 is a schematic sectional view illustrating the arbor tilted off the true centerline;

FIG. 8 is a sectional view taken along line 8—8 of FIG. 3 and viewed in the direction of the arrows;

FIG. 9 is a sectional view taken along line 9—9 of FIG. 4 and viewed in the direction of the arrows;

FIG. 10 is a perspective view of the pallet to which the laminations are mounted;

FIG. 15 is a schematic view illustrating the step of the method wherein the arbor is aligned by the upper locating pin and the bolts are being threaded into the pallet;

FIG. 16 is a schematic view illustrating the step of the method wherein the arbor is free pivoting;

FIG. 17 is a schematic view illustrating the pallet and compressed lamination stack moving out of the alignment station; and FIG. 18 is a plan view of the lamination stack.

DETAILED DESCRIPTION OF THE PREFERRED EMBODIMENT

Figure 1:
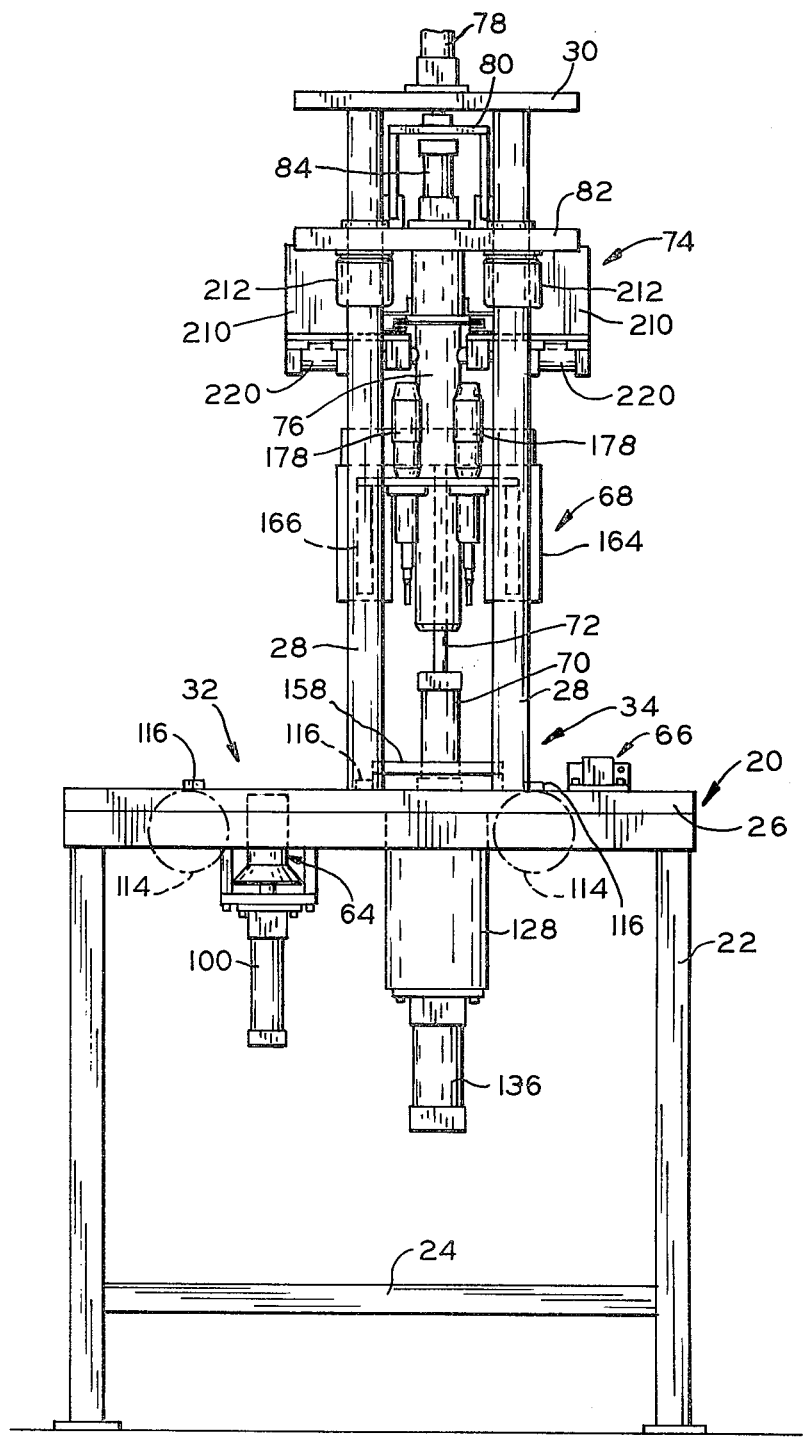
FIG. 1 is a front elevational view of an apparatus for aligning and bolting down stator laminations in accordance with the present invention.

Referring now to the drawings, and in particular to FIG. 1, the overall apparatus according to the present invention and capable of performing the method of the present invention is illustrated. The apparatus is supported on a supporting frame 20 comprising a plurality of legs 22, brace element 24 and base plate 26, which is rigidly connected to and supported by legs 22. Four guide posts 28 are rigidly connected to base plate 26 and connected at their upper ends by upper plate 30.

The apparatus includes a setup station 32 for the purpose of roughly aligning the carrier and laminations, and an alignment station 34 for precisely locating the carrier and laminations prior to compression and bolting of the laminations to the carrier. With reference to FIG. 10, a carrier, such as pallet 36, suitable for use in the apparatus and method of the present invention is illustrated. Pallet 36 is made of cast iron and comprises a flange portion 38 having very accurately machined shoulders 40 thereon, and a plurality of support pads 42 having upper surfaces 44 that are oriented parallel to surfaces 40 with a very high degree of accuracy. Surfaces 44 are all coplanar within a reference plane and together define the upper reference surface of pallet 36 adapted to support the stacked laminations 46 (FIG. 2) thereon.

Pallet 36 comprises an upstanding portion 48 on which the pads 44 are mounted and having an inner wall 50 defining an area to receive the lower end turns 52 of the stator windings 54 (FIG. 2), and an opening 56 concentric with tapped bolt receiving holes 59 that extend through tabs 44. Opening 56 has a tapered inner surface 58 that widens in the downward direction. It is important that pallet 36 be machined with a high degree of accuracy so that the tapered surface 58 of opening 56 is located very precisely relative to the tapped bolt holes 59, which, in the preferred embodiment, is coaxial to the circle within which the tapped holes 59 lie, and also that shoulders 40 be machined such that they are exactly parallel to the upper surfaces 44 of support pads 42, which defines the reference surface for the stacked laminations 54. The tapped portions of holes 59 are slightly recessed to enable bolts 88 to drop in place and roughly locate laminations 46 on pallet 36.

Returning now to FIG. 1, set up station 32 comprises a locating plug 64 which is moved upwardly in order to roughly position the pallet 36 and stacked laminations 46 before it is moved into the alignment station 34. An ejection station 66 is mounted to base plate 26 for the purpose of ejecting stator cores having rotor accommodating bores which are not aligned within predetermined tolerances. Bolt driver carrier assembly 68 is slidably mounted on guide posts 28 and raised and lowered by air cylinder 70 having plunger 72. Carrier 74 raises and lowers alignment arbor 76 under the action of air cylinder 78 mounted on top plate 30 and having its plunger connected to yoke 80, the latter being rigidly connected to carrier plate 82. A further air cylinder 84 is mounted on carrier plate 82 and reciprocates alignment pin 86 to align the upper end of arbor 76 as will be explained hereinafter in connection with FIG. 3. Guide posts 28 are very rigidly supported so that bolt driver carrier 68 and arbor carrier 74 move rectilinearly in the vertical direction with a high degree of accuracy.

Figure 2:
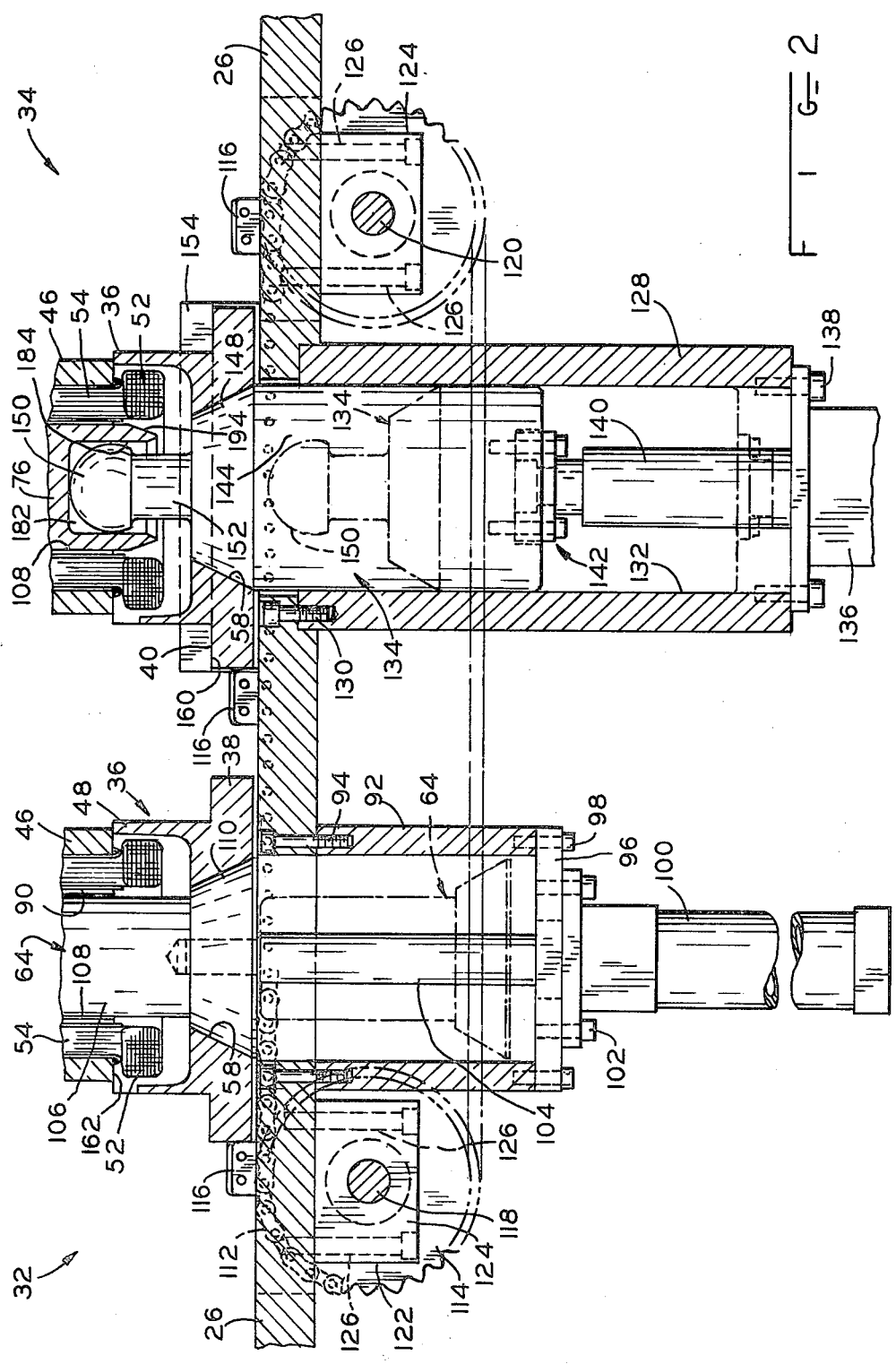
FIG. 2 is a sectional view of the lower portion of the apparatus of FIG. 1.

Referring now to FIG. 2, a pallet 36 having a plurality of laminations 46 stacked thereon is moved into the setup station 32. Laminations 46 are of conventional configuration having a plurality of clearance holes 86 therein of appropriate size to accommodate mounting bolts 88 (FIG. 15), and wherein laminations 46 may be stacked to any desired height depending on the motor design in question. If desired, windings 54 can be inserted into the slots 89 of stacked laminations 46 prior to bonding, and as discussed earlier, pallet 36 is shaped so as to accommodate the end turns 52. Customary slot liners 90 may be provided in order to insulate the windings 54 from laminations 46.

Setup station 32 comprises riser 92 connected to base plate 26 by screws 94, a mounting plate 96 connected to riser 92 by screws 98 and an air cylinder 100 connected to plate 96 by screws 102. Air cylinder 100 comprises plunger 104 threadedly fastened to locating plug 64. Locating plug 64 comprises a cylindrical upper portion 106 slightly smaller in diameter than the diameter of rotor accommodating bore 108 in lamination stack 46, and a tapered portion 110 which seats against tapered surface 58 in pallet 36. The cylindrical upper portion 106 roughly aligns laminations 46 and tapered portion 110 roughly positions pallet 36 before it is conveyed into alignment station 34.

Pallets 36 with lamination stacks 46 thereon are conveyed from setup station 32 into alignment station 34 by a conveyor comprising chain 112 supported on sprockets 114 at the entrance side of setup station 32 and the exit side of alignment station 34, and a plurality of tab members 116 connected to chain 112 and adapted to engage pallets 36 to move them into and out of setup station 32 and alignment station 34. Sprockets 114 are connected to shafts 118 and 120 rotatably received in bearing blocks 122 and 124, respectively, connected to base plate 26 by screws 126. Shaft 120 is driven by an electric motor (not shown).

The lower assembly of alignment station 34 comprises lower locating pin guide 128 connected to base plate 26 by screws 130 and having a cylindrical inner surface 132 adapted to very accurately guide cylindrical lower locating pin 134 for reciprocal movement in the vertical direction. Air cylinder 136 is connected to guide 128 by screws 138 and the plunger 140 thereof is connected to lower locating pin 134 by coupler 142. Lower locating pin 134 has a cylindrical lower portion 144, a tapered intermediate portion 148 machined to very precisely match tapered surface 58 of pallet 36, and an alignment head 150 joined to tapered portion 148 by shank 152. When pin 134 is driven upwardly by air cylinder 136, tapered portion 148 seats against tapered surface 58 on pallet 36 so as to very precisely locate the pallet at the desired true centerline of rotor accommodating bore 108. A pair of pallet retainer blocks 154 are rigidly connected to base plate 26 by screws 156 (FIGS. 4 and 9) and include overhanging shoulders 158 having surfaces 160 thereon which are very accurately machined to be parallel to the desired plane of the bottom 162 of lamination stack 46. As alignment pin 134 is raised by air cylinder 136, it lifts pallet 36, centers it by virtue of tapered surface 148, and clamps it against accurately machined surfaces 160. Since the upper surfaces 44 are parallel to surfaces 40, when surfaces 40 are pressed against reference surfaces 160, then the upper surfaces 44 of pallet 36 are parallel to the desired reference plane for the bottom 162 of lamination stack 46. When pallet 36 is raised and clamped in the manner just described, its upper reference surface defined by the upper surfaces 44 of pads 42 lies precisely in the reference plane for lamination stack 46. FIG. 2 illustrates locating plug 64 and lower locating pin 134 both in their upper positions and in their lower positions, the latter being indicated by dot-dash lines.

Figure 3:
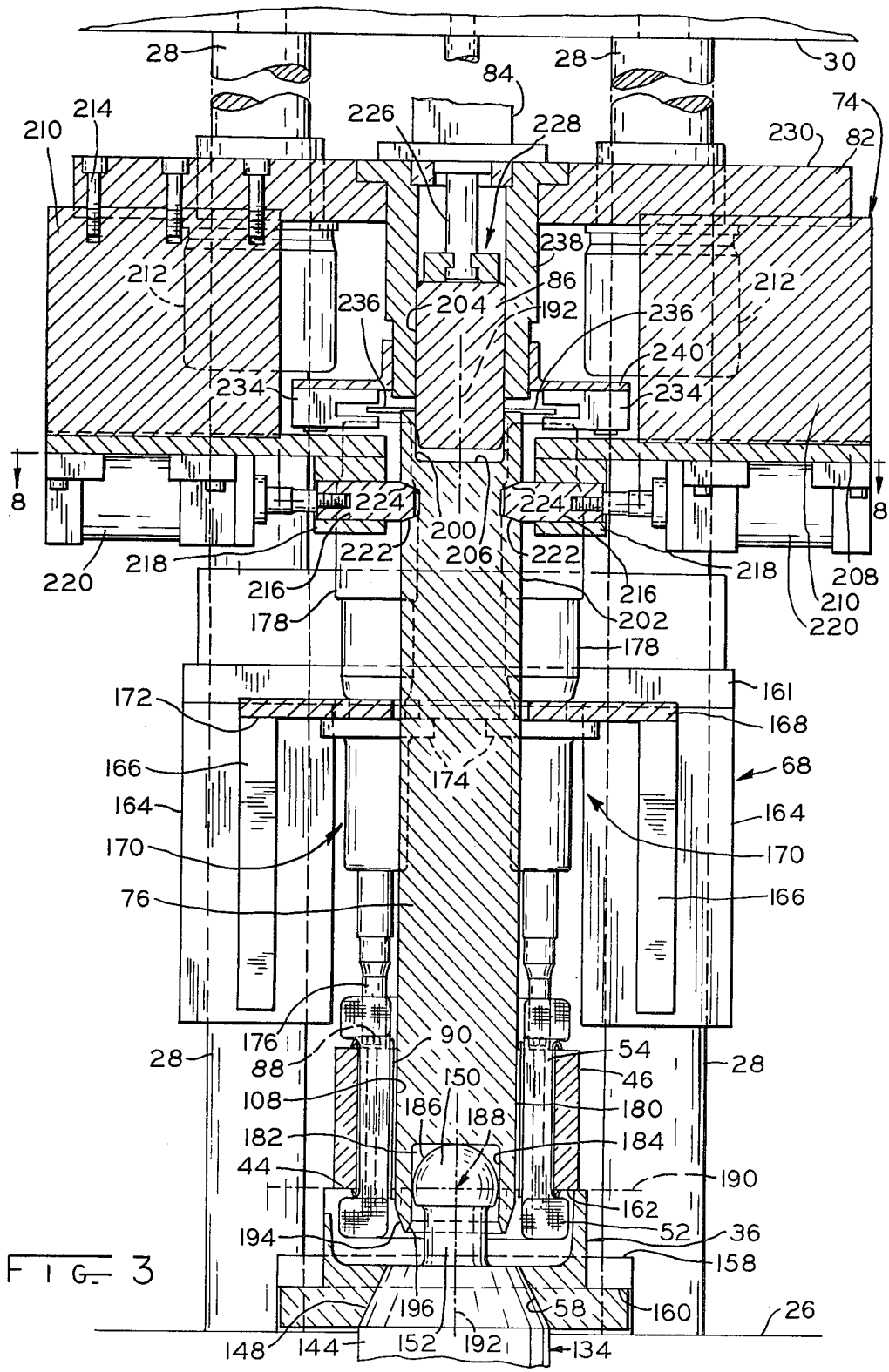
FIG. 3 is a sectional view of the upper portion of the apparatus.

Referring now to FIG. 3, the upper assembly of the apparatus will be described. Bolt driver carrier 68 is a weldment comprising top plate 162 to which bushings 164 are welded, wherein bushings 164 are slidably disposed over guide posts 28, side bracket members 166 connected to bushings 164, and plate 168 welded to brackets 166. Four air powered bolt drivers 170 are connected to the underneath surface 172 of plate 168 by brackets 174 and are equipped with sockets 176 adapted to rotate mounting bolts 88 thereby threading them into tapped holes 59 in pallet 36 (FIG. 10). Air motors 178, such as Ingersoll-Rand model 1401M2 air motors, rotate sockets 176. Bolt driver carrier 68 is raised and lowered by air cylinder 70, the plunger 72 of which is connected to plate 162.

A very rigid and accurately machined arbor 76 is lowered down through lamination stack 46 by arbor carrier assembly 74. Arbor 76 is generally cylindrical in shape with its outer surface 180, at least on the lower end thereof, machined such that it is just slightly smaller in diameter than the diameter of rotor accommodating bore 108 in lamination stack 46 so that when arbor 76 is inserted into the stack of loose laminations 46, laminations 46 align themselves with arbor surface 180. Arbor 76 has a socket 182 in the lower portion thereof having a cylindrical inner surface 184 which is machined such that it has just enough clearance with the outer surface 186 of arbor locating head 150 that it is able to be inserted over head 150. Outer surface 186 of head 150 is machined to be spherical in shape and have a center of rotation at the intersection 188 of reference plane 190 coplanar with the bottom surface 160 of stack 46 and the desired true centerline 192 of arbor 76 and rotor accommodating bore 108, which is perpendicular to reference plane 190. Lower surfaces 194 and 196 of arbor 76 are tapered in order to permit arbor 76 to be tilted slightly after it is inserted into lamination stack 46.

FIGS. 6 and 7 indicate the action of arbor 76 as it tilts about arbor locating head 150. In FIG. 6, arbor 76 is precisely vertical to centerline 190 such that its axis is perpendicular to reference plane 190 at the bottom of lamination stack 46. FIG. 7 illustrates an exaggerated tilting of arbor 76 such that its axis 192A is no longer coaxial with the desired centerline 192, but since the center of rotation of spherical surface 186 is within reference plane 190 and arbor 76 is capable of universal pivoting movement about spherical head 150, and therefore at the center of rotation 188 of head 150, its outer surface 180 remains coaxial with true centerline 192, as indicated by arrows 198. This insures that the rotor accommodating opening 108 at the bottom of stack 46 is always concentric with the desired true centerline for rotor accommodating bore 108 and is the reference dimension for bore 108. Thus, if arbor 76 can be oriented such that it is perpendicular to reference plane 190, then it follows that rotor accommodating bore 108 will be perpendicular to reference plane 190, which is coplanar with the bottom of lamination stack 46, and will be concentric with the mutual center of bolt holes 86 so that when the stator core is mounted to a compressor housing or other installation, bore 108 will be concentric with the axis of the rotor. Of course, clearance holes 86 can be located in any desired pattern as long as there is correspondence between their pattern and the pattern of bolt holes on the surface on which the motor will eventually be mounted. The concentricity of the bottom of lamination stack 46 to desired true centerline 192 will always result, regardless of the tilting of arbor 76, within its limits of tilt.

Arbor 76 is oriented precisely perpendicular to reference plane 190 by means of upper locating pin 86, which is inserted into axial socket 200 in the upper end portion 202 of arbor 76. Pin 86 has a cylindrical outer surface 204 having an axis that is coaxial with the axis of arbor 76 and cylindrical socket 200 and with an outer diameter that is just slightly smaller than the inner diameter of socket 200. Alternatively, pin 86 could be tapered with the axis of the taper being coaxial with centerline 192 and with an outer diameter that is equal to the inner diameter of socket 200 such that arbor 76 is centered before the pin 86 would bottom out against the lower surface 206 of socket 200. Of course, pin 86 could be replaced by a cylindrical or tapered socket which would fit over the end of arbor 76. Regardless of the technique used, what is important is that when pin 86 is fulled seated against the upper end portion 202 of arbor 76, arbor 76 is oriented exactly perpendicular to reference plane 190.

Arbor 76 is raised and lowered by arbor carrier 74, which comprises cylinder mounting plate 208 connected to plate 82 by a pair of standoffs 210, and this assembly is slidably guided along guide posts 28 by four bushings 212. Standoffs 210 are connected to plate 82 by screws 214. Arbor 76 is engaged and lifted by a pair of lift pins 216 received in guide blocks 218 that are connected to plate 208. Pins 216 are reciprocated by air cylinders 220 connected to plate 208 and the forward ends 222 thereof are tapered and adapted to be received in tapered sockets 224 in arbor upper end portion 202. When pins 216 are retracted by air cylinders 220, arbor 76 is located at its upper end solely by upper locating pin 86. As discussed earlier in connection with FIG. 1, air cylinder 78, which is connected to plate 82 by yoke 80, reciprocates plate 82 in the vertical direction.

Upper locating pin 86 is connected to the plunger 226 of air cylinder 84 by coupling 228, and air cylinder 84 is mounted to the upper surface 230 of plate 82. With lift pins 222 and upper locating pin 86 retracted, arbor 76 is free to pivot about the center of rotation 188 of lower locating pin head 150 so that the non-perpendicularity of arbor 76 and, therefore, rotor accommodating bore 108, can be measured by measuring the degree of lateral displacement of the upper end portion 202 of arbor 76. Since arbor 76 extends out of lamination stack 46 by a distance which is several times greater than the height of lamination stack 46, any misalignment at the top of the stack 46 will be amplified thereby enabling it to be detected and measured with much greater accuracy. In order to detect whether the degree of misalignment of arbor 76 is within tolerances, four electronic pickups 234 are positioned around the upper end 202 of arbor 76, and detect the edges of actuator flags 236 in the two orthogonal coordinates. Pickups 234, which may be type 58 Dynapar electromagnetic pickups, are mounted to guide busing 238 for upper locating pin 86 by mounts 240. Actuator flags 236 are connected to the upper end of arbor 76. For example, the ratio of the distance along arbor 76 between reference plane 190 and indicator flags 236 at the top of arbor 76 is approximately 15.4 inches, and the distance between reference plane 190 and the top of lamination stack 46 is approximately 2.75 inches. The ratio of these two lengths, then, is 5.6 to 1, so that the amplification of any misalignment at the top of lamination stack 46 is amplified by a factor of 5.6. Of course, the ratio could be any preselected value depending on the degree of accuracy which is desired and any dimensional constraints of the apparatus. The same apparatus can be used for manufacturing stator cores of various stack heights, and although this will change the amplification factor, this can be corrected by electrical compensation in the circuitry which determines whether the core is within acceptable tolerances.

By virtue of the above arrangement, when bolts 88 have been threaded into pallet 36 with the proper torque thereby compressing laminations 46, and lift pins 216 and upper locating pin 86 are retracted, arbor 76 is free to rotate about spherical head 150 under the influence of any biases set up in lamination stack 46. This will result in a tilting of arbor 76, and it can be detected by pickups 234 whether the degree of tilt is within predetermined tolerances. If arbor 76 tilts too far, then it is known that the extent of misalignment of rotor accommodating bore 108 at the top of lamination stack 46 is greater than permissible for the particular application, and the stator core will be rejected.

Figure 4:
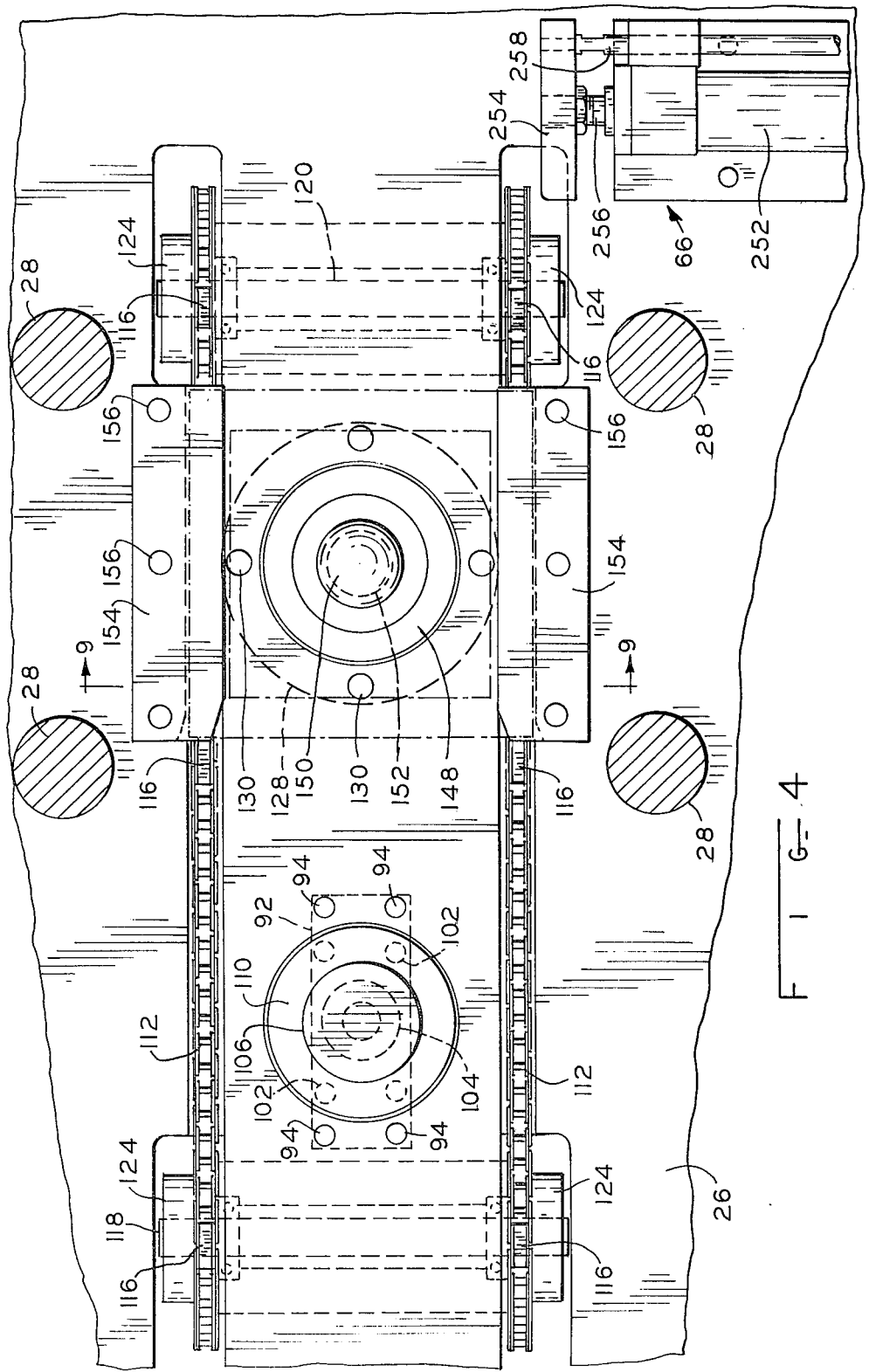
FIG. 4 is a plan view of the lower portion of the apparatus.

FIG. 4 illustrates a suitable ejector mechanism 66 for ejecting defective stators out of the normal path of movement. It comprises an air cylinder 252 mounted to base plate 26 and comprising an ejector plate 254 connected to plunger 256 of air cylinder 252 and guided by guide rods 258. Appropriate circuitry and valving (not shown) can be connected between electronic pickups 238 and air cylinder 252 to cause plate 254 to be extended when a pallet containing a defective stator core is positioned in front of plate 254, thereby pushing it laterally out of the path of movement.

FIG. 5 illustrates in greater detail the guiding arrangement on the two rear guide posts 28. In order to provide additional stability for arbor carrier 82, four additional guide rods 260 are connected between plates 30 and 82. The upper ends of guide rods 260 are secured to plate 30 by nuts 262, and the lower ends thereof are connected to plate 88 by washers 264 and bolts 266. The upper ends of main guide posts 28 are connected to plate 30 by nuts 268. Air cylinder 78 for arbor carrier 82 comprises a plunger rod 270 connected to yoke 80.

OPERATION

Figure 11:
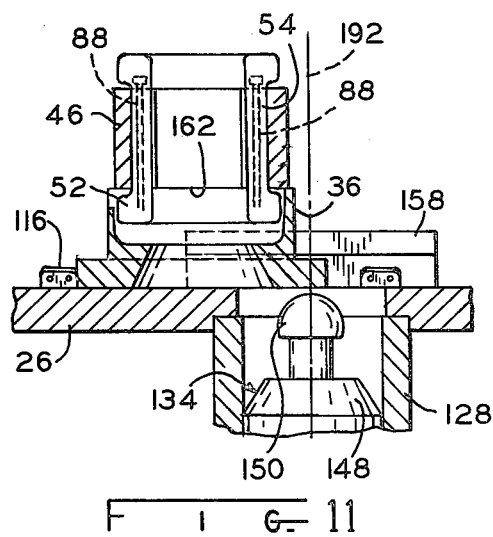
FIG. 11 is a schematic view illustrating the method of the present invention wherein the stator and pallet are being moved into the alignment station.

The operation of the apparatus described above as well as the method of the present invention will now be described with reference to FIGS. 11-17. Referring first to FIG. 11, the stack of loose laminations 46 having windings 54 therein are preassembled to pallet 36, with the bottom surface 162 of lamination stack 46 being supported on the upper reference surfaces 44 of pads 42.

Four mounting bolts 88 are inserted into clearance holes 86 in lamination stack 46 and loosely received in holes 59 in pallet 36.

Figure 12:
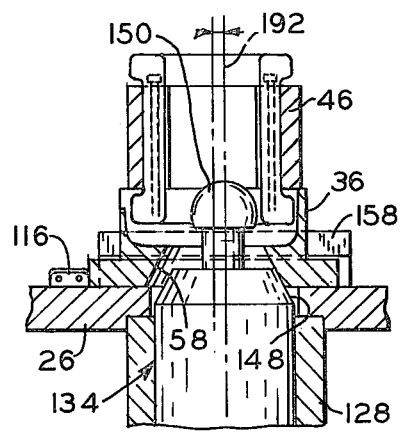
FIG. 12 is a schematic view illustrating the step of the method wherein the pallet is being aligned by the lower locating pin.
Figure 13:
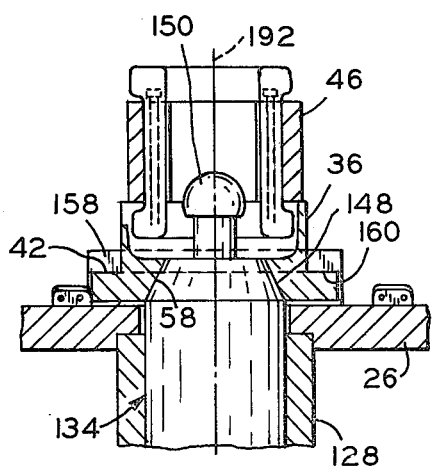
FIG. 13 is a schematic view illustrating the step of the method wherein the pallet is in alignment and clamped against the retainer blocks.
Figure 14:
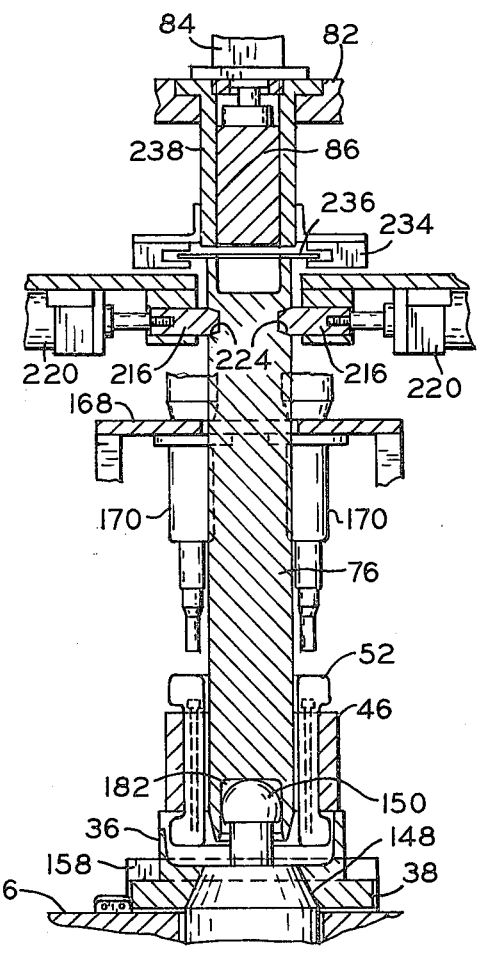
FIG. 14 is a schematic view illustrating the step of the method wherein the alignment arbor is lowered onto the lower locating pin.

The conveyor is activated by driving shaft 120 so that chain 112 and two of the conveyor tabs 116 connected thereto pushes pallet 36 with the preassembled lamination stack 46 into setup station 32. At this time, locating plug 64 is retracted until the pallet is approximately over it, at which time the conveyor is stopped, locating plug 64 is extended to roughly position pallet 36 and roughly align loose laminations 46. The conveyor is again started and pallet 36 is pushed into alignment station 34 as illustrated in FIG. 11 with the machined surfaces 40 on flanges 38 sliding underneath overhanging retainer blocks 158. Referring now to FIG. 12, when pallet 36 is approximately over lower locating pin 134, the conveyor is stopped, and pin 134 is raised by activating air cylinder 136. FIG. 12 shows pallet 36 being slightly off true centerline 192, so that when air cylinder 136 is activated, tapered surface 148 contacts correspondingly tapered surface 58 to thereby center pallet 36 along the true centerline 192 as shown in FIG. 13. At the same time, pallet 36 is raised and clamped against accurately machined surfaces 160 on blocks 158 so that pallet 36 is not only aligned concentric with centerline 192, but is oriented such that upper surfaces 44 of pads 42, which are coplanar with the bottom of stack 42, are precisely in the desired reference plane.

Next, arbor 76, which is engaged by lift pins 216, is lowered through lamination stack 46 by activating air cylinder 78. As arbor 76 passes through the rotor accommodating bore 108 of lamination stack 46, it precisely aligns each of the laminations with the cylindrical outer surface 180 of arbor 76 due to the very close clearance between the arbor outer diameter and the diameter of bore 108. Arbor 76 is lowered until it contacts spherical head 150 of lower locating pin 134. At this time, lift pins 216 are retracted by cylinders 220 and upper locating pin 86 is lowered into arbor socket 206 by air cylinder 84, thereby aligning arbor 76 perpendicular to reference plane 190 such that it is coaxial with the desired centerline 192 with a very high degree of accuracy. As discussed earlier, because the lower portion of arbor 76 rotates about a center of rotation that lies with the reference plane and the centerline 192, the bottom of rotor accommodating bore 108 will be precisely coaxial with the true centerline 192. Because of the close clearance between socket 182 and surface 186 on spherical head 150, the lower end portion of arbor 76 is not capable of moving laterally within the reference plane, but is only capable of rotational movement. Still referring to FIG. 15, while arbor 76 is held perpendicular, bolt drivers 170 are lowered by carrier 68 until they engage bolts 88 and simultaneously thread them into pallet 36 with a predetermined amount of torque. This compresses laminations 46 and secures them to pallet 36, and may also setup forces within the compressed stack 46 which tend to urge arbor 76 to tilt off the true centerline. Of course, as long as pin 86 is inserted in socket 206, arbor 76 will not move, but as soon as pins 86 and 216 are withdrawn as shown in FIG. 16, arbor 76 is supported only by rotor accommodating bore 108 and spherical head 152. Accordingly, if rotor accommodating bore 108 is not precisely perpendicular due to forces setup within compressed lamination stack 46, arbor 76 will be tilted off centerline 192 in some direction. The degree of tilt is sensed by pickups 234 and will cause the stator to be ejected later.

After the misalignment has been detected and registered, lift pins 216 are projected into sockets 224 in arbor 76, air cylinder 78 is activated to lift arbor carrier 74 thereby lifting arbor 76 out of lamination stack 46, lower locating pin 134 is retracted, and pallet 36 with its associated compressed lamination stack is moved out of the alignment station 34 by the conveyor mechanism. The core will subsequently be dipped in or sprayed with epoxy or other suitable adhesive, bonded by baking it in an oven, and then removed from its pallet 36.

Although a particular apparatus has been disclosed as preferred for accomplishing the invention, it is contemplated that changes as to the precise arrangement, shapes, details and connections of the component parts of such apparatus, as well as the precise steps and order of the method, may be made by those having ordinary skill in the art without departing from the spirit of the invention of the scope thereof as set forth by the claims which follow.

What I claim as new and desire to secure by Letters Patent of the United States is:

1. A method of aligning laminations in a stator core wherein each lamination has an opening therein comprising the steps: providing a carrier having at least one reference surface defining a reference plane; arranging the laminations in a stacked relation with one end of the lamination stack supported on the carrier reference surface such that the openings are aligned to form a rotor accommodating bore; inserting an arbor into the bore; anchoring the arbor at a first location on the arbor near the end of the stack that is supported on the carrier reference surface; anchoring the arbor at a second location on the arbor beyond the end of the stack opposite the end supported on the carrier reference surface, the arbor being perpendicular to the reference plane and having a very close clearance with the rotor accommodating bore of the stack to thereby orient the bore perpendicularly to the reference plane, the anchoring of the arbor at the second location being independent of the anchoring of the arbor at the first location; compressing the laminations together and securing the laminations to the carrier reference surface while the arbor is anchored perpendicularly to the reference plane.

2. The method of claim 1 wherein the carrier has an opening therein, the arbor is anchored at a first location by a locating element that extends upwardly through the carrier opening and engages the arbor.

3. The method of claim 2 wherein the locating element has a curved surface with a circular cross section in planes parallel to the reference plane, and the arbor is anchored at the first location by providing a socket in one end of the arbor and causing the curved surface to be received in the socket with the locating element curved surface in contact with the socket and enabling limited tilting of the arbor about the locating element curved surface.

4. The method of claim 1 wherein the arbor is anchored at the first location by pivotally capturing a lower end of the arbor such that the cross section of the arbor intersected by the reference plane is always concentric to a fixed axis perpendicular to the reference plane.

5. The method of claim 4 wherein the lower end of the arbor comprises a socket that is disposed over and has received therein a bulbous locating element when the arbor is inserted into the bore, and the locating element is rigidly located relative to the carrier.

6. The method of claim 1 wherein the carrier has an opening with tapered surfaces, and including the step of moving upward a tapered plug to engage the tapered surface of the carrier opening and thereby center the carrier relative to the arbor.

7. The method of claim 6 wherein the arbor is anchored at the first location by lowering the arbor into engagement with a porton of the pin that centers the carrier.

8. The method of claim 1 wherein the arbor is anchored in a first location by engaging the arbor precisely in the reference plane, and is located in the second location by inserting a pin axially into a socket in the arbor.

9. A method of aligning laminations in a stator core wherein each lamination has an opening therein comprising the steps: providing a carrier having a reference surface defining a reference plane; stacking a plurality of laminations on the carrier reference surface to form a stack with one end of the stack being supported on the carrier reference surface such that the lamination openings are aligned to form a rotor accommodating bore; inserting an elongate arbor into the rotor accommodating bore, the arbor having a close clearance with the bore; pivotally capturing one end portion of the arbor in the reference plane such that the arbor is capable of universal pivoting movement about a center of rotation lying in the reference plane but the one end portion in the reference plane is restrained from moving laterally relative to the axis of the rotor accommodating bore; rigidly anchoring the arbor at a position on the arbor axially beyond the end of the stack of laminations opposite the one end supported on the carrier such that the arbor and the rotor accommodating bore are perpendicular to the reference plane; then compressing the laminations together and securing the compressed laminations to the carrier reference surface while the arbor is anchored perpendicular to the reference plane.

10. The method of claim 9 wherein the carrier includes an opening therein, and including the steps: moving the carrier with the laminations stacked thereon into an alignment station, extending a pin upwardly through the carrier opening to center the carrier relative to the arbor and clamping the carrier in place, lowering the arbor into engagement with the pin in order to pivotally capture one end of the arbor in the reference plane, then moving an upper locating element into engagement with an upper end of the arbor to rigidly anchor the arbor against any tilting movement, inserting threaded fasteners through the laminations, then threading the laminations to the carrier to thereby compress the laminations and secure the laminations to the carrier then moving the upper locating element out of engagement with the upper end of the arbor to permit the arbor to rotate about the center in the reference plane under the influence of the compressed laminations, then sensing the degree of non-perpendicularity of the arbor relative to the reference plane after the upper locating element has disengaged the arbor, and subsequently moving the carrier and lamination stack out of the alignment station.

11. The method of claim 9 including the steps of engaging the carrier from underneath to position the carrier in a predetermined location relative to the arbor and then rigidly clamping the carrier in the predetermined location.

12. The method of claim 11 wherein the carrier includes an opening therethrough, and the carrier is positioned so that the carrier opening is concentric with the arbor, and including the step of connecting the arbor one end to a capture element through the opening in the carrier so as to center the arbor in the carrier opening, the capture element being engaged by the arbor in the reference plane.

13. The method of claim 11 wherein the carrier is moved upwardly and clamped in the predetermined location against a plurality of overhanging shoulders.

14. The method of claim 9 wherein the carrier includes an opening therethrough, the carrier is located in a predetermined position relative to the arbor and then rigidly secured in the predetermined position, and the one end of the arbor is pivotally captured by connecting it to a locating element extending through the carrier opening, the locating element engaging the arbor in the reference plane.

15. The method of claim 14 wherein the locating element comprises a bulbous portion having a circular cross section in planes parallel to the reference plane received in a socket in the end of the arbor, and the arbor has a circular cross section outer surface that is always concentric with the bulbous portion of the locating element in the reference plane as the arbor is pivoted about the aforementioned center in the reference plane when the anchoring of the arbor is disengaged.

16. The method of claim 9 wherein the arbor is inserted into the rotor accommodating bore by a reciprocating carriage that engages the arbor and lowers the arbor through the stack into engagement with a locating element extending upwardly through an opening in the carrier, the locating element pivotally capturing the arbor in the reference plane.

17. A method of aligning laminations in a stator core and detecting any misalignment wherein each lamination has an opening therein comprising the steps: providing a carrier having a reference surface defining a reference plane; stacking a plurality of laminations on the carrier reference surface to form a stack with one end of the stack being supported on the carrier reference surface such that the lamination openings are aligned to form a rotor accommodating bore; inserting an elongate arbor into the rotor accommodating bore, the arbor having a close clearance with the bore; pivotally capturing one end portion of the arbor in the reference plane such that the arbor is capable of universal pivoting movement about axes lying only in the reference plane and intersecting the arbor axis but the one end portion in the reference plane is restrained from moving laterally relative to the axis of the rotor accommodating bore; rigidly anchoring the arbor at a position on the arbor axially beyond the end of the stacked laminations opposite the one end supported on the carrier such that the arbor and the rotor accommodating bore are perpendicular to the reference plane; then compressing the laminations together and securing the compressed laminations to the carrier reference surface while the arbor is anchored perpendicular to the reference plane; then disengaging the anchoring of the arbor at the position axially beyond the end of the stack opposite the carrier with the arbor one end portion still pivotally captured in the reference plane whereby the arbor is free to pivot about the reference plane axes under the influence of the compressed lamination stack; and sensing the degree to which the free pivoting arbor is non-perpendicular to the reference plane.

18. The method of claim 17 including the steps of engaging the carrier from underneath to position the carrier in a predetermined location relative to the arbor and then rigidly clamping the carrier in the predetermined location.

19. The method of claim 18 wherein the carrier includes an opening therethrough, and the carrier is positioned so that the carrier opening is concentric with the arbor, and including the step of connecting the arbor one end to a capture element through the opening of the carrier so as to center the arbor in the carrier opening, the capture element being engaged by the arbor in the reference plane.

20. The method of claim 19 wherein the carrier opening is tapered, and the carrier is positioned by engaging the tapered opening by a tapered pin moved upwardly into engagement with the tapered opening.

21. The method of claim 18 wherein the carrier is moved upwardly and clamped in the predetermined location against a plurality of overhanging shoulders.

22. The method of claim 17 wherein the carrier includes an opening therethrough, the carrier is located in a predetermined position relative to the arbor and then rigidly secured in the predetermined position, and the one end of the arbor is pivotally captured by connecting it to a locating element extending through the carrier opening, the locating element engaging the arbor in the reference plane.

23. The method of claim 22 wherein the locating element comprises a bulbous portion having a circular cross section in planes parallel to the reference plane received in a socket in the end of the arbor, and the arbor has a circular cross section outer surface that is always concentric with the bulbous portion of the locating element in the reference plane as the arbor is pivoted about the aforementioned axes in the reference plane when the anchoring of the arbor is disengaged.

24. The method of claim 17 wherein the arbor is anchored at the position beyond the opposite end of the stack of laminations by inserting a pin axially into an opening in the arbor.

25. The method of claim 17 wherein the degree of non-perpendicularity of the arbor to the reference plane is sensed by detecting the distance that a portion of the free pivoting arbor has moved laterally away from its position when anchored during compression and securing of the laminations.

26. The method of claim 25 wherein the distance that the free pivoting arbor has moved is sensed by providing peripherally around the arbor a plurality of sensors that are sensitive to displacement of the arbor, and providing an output from the sensors corresponding to any misalignment of the arbor.

27. The method of claim 17 wherein the arbor is inserted into the rotor accommodating bore by a reciprocating carriage that engages the arbor and lowers the arbor through the stack into engagement with a locating element extending upwardly through an opening in the carrier, the locating element serving to pivotally capture the arbor in the reference plane.

28. The method of claim 27 including the step of disengaging the arbor from the carriage during sensing of the non-perpendicularity.

29. The method of claim 28 including the step of moving the carrier carrying the stacked laminations into alignment with the arbor and locating element by a conveyor.

30. The method of claim 27 including inserting a plurality of threaded fasteners into clearance holes in the stack of laminations and threading the fasteners to the carrier while the arbor is anchored in order to compress the laminations and secure them to the carrier.

31. The method of claim 17 including the step of placing stator windings in the stack of laminations prior to inserting the arbor into the stack.

32. Apparatus for aligning laminations in a stator core wherein the laminations each includes an opening therein and are loosely stacked with the openings generally aligned to form a rotor accommodating bore, the apparatus comprising: a carrier having at least one reference surface defining a reference plane for supporting the stack of laminations; an arbor having a first end portion and an opposite end portion and a portion to be received in the rotor accommodating bore of the lamination stack having an outer surface just slightly smaller than the inner diameter of the rotor accommodating bore; means for locating said first end portion of said arbor against any lateral movement in the reference plane but enabling universal pivoting movement of said arbor about a center of rotation located in the reference plane; and means for rigidly anchoring the second end portion of said arbor at a location of the arbor axially displaced beyond the portion thereof to be received in the rotor accommodating bore, said arbor locating means and said arbor anchoring means cooperating to align said arbor perpendicular to the reference plane defined by the carrier reference surface.

33. The apparatus of claim 32 wherein said carrier comprises an opening therein, and said means for locating the first end portion of said arbor comprises a locating pin and means for moving said locating pin upwardly through the carrier opening and into engagement with said arbor.

34. The apparatus of claim 33 including a plurality of overhanging shoulders, and said locating pin includes a surface for engaging said carrier, and said means for moving said locating pin upwardly causes the pin surface to raise said carrier and clamp said carrier against said shoulders.

35. The apparatus of claim 34 wherein said carrier opening includes a tapered surface around its periphery and said locating pin includes a complementary tapered surface.

36. The apparatus of claim 32 wherein said carrier includes an opening therein and including a lower locating pin and means for moving said locating pin into said carrier opening to position said carrier in register with said arbor.

37. The appparatus of claim 36 wherein said means for locating comprises an extension on said locating pin engageable with said arbor, said means for rigidly anchoring comprises an upper locating pin engageable with the second end portion of said arbor, and said carrier opening, said upper and lower locating pins, and said arbor are mutually coaxial.

38. The apparatus of claim 32 wherein said means for locating comprises: an upwardly projecting pivot element located in the reference plane and having a spherical upper surface with the geometrical center of said spherical surface lying in the reference plane, and a socket in the first end portion of said arbor in which said pivot element is received when said arbor is located.

39. The apparatus of claim 32 including means for reciprocating said arbor into and out of the stack of laminations comprising means selectively for engaging said arbor to raise and lower said arbor and selectively for disengaging said arbor when said arbor is anchored in place.

40. The apparatus of claim 32 wherein said means for anchoring the second end portion of said arbor comprises an upper locating element engageable with said arbor and means for reciprocating said upper locating element axially against the arbor second end portion.

41. Apparatus for aligning laminations in a stator core wherein the laminations each includes an opening therein and are loosely stacked with the openings generally aligned to form a rotor accommodating bore, the apparatus comprising: a carrier having a reference surface defining a reference plane for supporting the stack of laminations; an elongate arbor having a first end portion, an opposite second end portion, and a portion intermediate the end portions having an outer surface just slightly smaller than the inner diameter of the rotor accommodating bore; means connected to said arbor for inserting said arbor into the bore of the stack supported on said carrier reference surface such that the intermediate portion of the arbor engages the laminations and aligns the laminations along the axis of said arbor; means for locating the first end porton of said arbor against any lateral movement in the reference plane but enabling universal pivoting movement about a center of rotation lying in the reference plane and intersecting the arbor axis; means selectively for engaging the second end portion of said arbor at a location on said arbor axially displaced beyond the portion thereof received in the stack to anchor the second end portion of said arbor and align said arbor perpendicular to the reference plane; means for compressing the laminations in a direction parallel to the axis of the rotor accommodating bore and for securing the compressed laminations to said carrier while said arbor is anchored by said means for engaging; and means operative when the second end portion of said arbor is released by said means for engaging for detecting the displacement of the arbor second end portion from its former position when it was anchored by said means for engaging and indicating the degree of misalignment of said arbor under the influence of the compressed laminations.

42. The apparatus of claim 41 wherein said means for engaging the second end portion of said arbor comprises an upper locating element and means for reciprocating said upper locating element in an axial direction relative to said arbor into and out of engagement with said arbor second end portion.

43. The apparatus of claim 41 wherein said means for detecting comprises a plurality of position sensors located around said arbor second end portion.

44. The apparatus of claim 41 wherein said means for locating comprises: an upwardly projecting pivot element located in the reference plane and having a spherical upper surface with the geometrical center of said spherical surface lying in the reference plane, and a socket in the first end portion of said arbor in which said pivot element is received when said arbor is located.

45. The apparatus of claim 41 including means for reciprocating said arbor into and out of the stack of laminations comprising means selectively for engaging said arbor to raise and lower said arbor and selectively for disengaging said arbor when said arbor is anchored in place.

46. The apparatus of claim 41 including conveyor means for moving said pallet with the laminations stacked thereon into and out of alignment with said arbor.

47. The apparatus of claim 46 including a set-up station comprising second arbor means for engaging said carrier and the laminations stacked thereon to rough position the carrier and the laminations on the carrier, said conveyor means conveying the carrier and lamination stack from the set-up station into a position in alignment with said arbor.

48. Apparatus for aligning laminations in a stator core and detecting any misalignment thereof wherein the laminsations each has an opening therein and are loosely stacked with the openings generally aligned to form a rotor accommodating bore, the apparatus comprising: a support having a reference surface thereon coplanar with a reference plane, said support for supporting one end of the lamination stack thereon; an elongate arbor to be positioned in and extend through the rotor accommodating bore of the stack; means for rigidly immobilizing said arbor in a predetermined orientation to the reference plane along a reference axis, the arbor having a very close clearance with the bore to thereby orient the bore to the reference plane along the reference axis, a substantial portion of said arbor extending beyond the end of the lamination stack opposite the end thereof supported on the reference surface; means for compressing the laminations together; means for releasing said arbor while the laminations are in a compressed state to enable said arbor to tilt relative to the reference axis under the influence of the stacked laminations; and means for sensing the lateral displacement of said arbor from the reference axis at a reference position on said arbor substantialy beyond the end of the stack opposite the end thereof supported on the reference surface, the distance between the reference position and the reference plane being substantially greater than the distance along said arbor between the end of the stack by a preselected ratio, whereby the amount of misalignment of the arbor within the stack is amplified at the reference point on said arbor by a factor related to the preselected ratio.

49. The apparatus of claim 48 wherein said means for rigidly immobilizing said arbor comprises means for capturing one end of said arbor for universal pivoting movement around a point in the reference plane.

50. The apparatus of claim 49 wherein said means for rigidly immobilizing said arbor comprises means selectively for anchoring said arbor at an end thereof opposite said one end.

51. The apparatus of claim 48 wherein said preselected ratio is greater than 5.

52. The apparatus of claim 48 wherein said support comprises a carrier with an opening therein, said means for rigidly immobilizing said arbor comprises: a lower locating element extending through said carrier opening, means for connecting a lower end of said carrier to said locating element, and means selectively for anchoring said arbor at an end thereof opposite said lower end.

53. The apparatus of claim 52 wherein the reference position is substantially at one end of said arbor.

54. The apparatus of claim 48 wherein said means for sensing comprises a plurality of sensors positioned peripherally around said arbor at said reference position.

55. A method of aligning laminations in a stator core and detecting any misalignment thereof wherein each lamination has an opening therein, comprising the steps: arranging the laminations in a stacked relation with one end of the lamination stack being supported on a reference surface such that the openings are aligned to form a rotor accommodating bore, the reference surface being coplanar with a reference plane; positioning an elongate arbor in the rotor accommodating bore and rigidly immobilizing the arbor in a predetermined orientation to the reference plane along a reference axis, the arbor having a very close clearance with the bore to thereby orient the bore to the reference plane along the reference axis, a substantial portion of the arbor extending beyond the stack opposite end; compressing the laminations together; while the laminations are compressed, releasing the arbor to enable it to tilt relative to the reference axis under the influence of the stacked laminations; and sensing the lateral displacement of the arbor from the reference axis at a reference position on the arbor substantially beyond said stack opposite end, the distance between the reference point and the reference plane being substantially greater than the distance between said stack opposite end and the reference plane by a preselected ratio, whereby the amount of misalignment of the rotor at said opposite end of the stack is amplified by a factor related to the preselected ratio.

56. The method of claim 55 including the step of pivotally capturing a lower end of the arbor such that it is capable of universal pivoting movement about a center of rotation lying within the reference plane when the arbor is released, and the factor of amplification is equal to said preselected ratio.

57. The method of claim 55 wherein the step of immobilizing the arbor comprises capturing an upper end portion of the arbor.

58. The method of claim 55 wherein the step of sensing comprises providing at least one sensor adjacent the reference position on the arbor and detecting the proximity of the arbor to the sensor.

59. The method of claim 55 wherein the preselected ratio is greater than 5.

* * * * *